US012549360B2

(12) United States Patent
Donzis et al.

(10) Patent No.: US 12,549,360 B2
(45) Date of Patent: Feb. 10, 2026

(54) EXTENSIONS TO WIREGUARD FOR ADDRESS ASSIGNMENT AND ROUTE ANNOUNCEMENT

(71) Applicant: PERFTECH, INC., San Antonio, TX (US)

(72) Inventors: Lewis T. Donzis, San Antonio, TX (US); Lee Carl Ziegenhals, Boerne, TX (US)

(73) Assignee: PERFTECH, INC., San Antonio, TX (US)

( * ) Notice: Subject to any disclaimer, the term of this patent is extended or adjusted under 35 U.S.C. 154(b) by 65 days.

(21) Appl. No.: 18/620,907

(22) Filed: Mar. 28, 2024

(65) Prior Publication Data

US 2025/0310104 A1    Oct. 2, 2025

(51) Int. Cl.
  *H04L 9/14*       (2006.01)
  *H04L 12/46*      (2006.01)
  *H04L 45/741*     (2022.01)
  *H04L 61/5061*    (2022.01)

(52) U.S. Cl.
  CPC ............ *H04L 9/14* (2013.01); *H04L 12/4633* (2013.01); *H04L 45/741* (2013.01); *H04L 61/5061* (2022.05)

(58) Field of Classification Search
  CPC ..... H04L 9/14; H04L 12/4633; H04L 45/741; H04L 61/5061
  See application file for complete search history.

(56) References Cited

U.S. PATENT DOCUMENTS

| | | | |
|---|---|---|---|
| 11,438,178 B2* | 9/2022 | Pahl | H04L 63/0823 |
| 2011/0138178 A1* | 6/2011 | Bajar | H04L 63/0428 |
| | | | 713/168 |
| 2012/0188949 A1* | 7/2012 | Salkintzis | H04W 40/02 |
| | | | 370/329 |
| 2019/0097794 A1* | 3/2019 | Nix | G06F 21/33 |
| 2019/0097976 A1* | 3/2019 | Elsins | H04W 76/10 |
| 2022/0247732 A1* | 8/2022 | Krohn | H04L 9/14 |
| 2023/0259925 A1* | 8/2023 | Wu | G06Q 20/108 |
| | | | 705/71 |

* cited by examiner

*Primary Examiner* — SM A Rahman

(57) ABSTRACT

An example operation may include one or more of storing a public key of a router and a private key of the router, connecting to a network through one or more network connection ports of the router, transmitting the public key of the router to a remote device and receiving a public key of the remote device via a network connection port during a public key exchange, activating a virtual private network (VPN) on the network connection port based on the public key exchange, selecting an Internet Protocol (IP) address for the remote device, and encrypting a packet with the IP address based on the public key of the remote device and transmitting the encrypted packet to the remote device via the VPN.

20 Claims, 14 Drawing Sheets

100

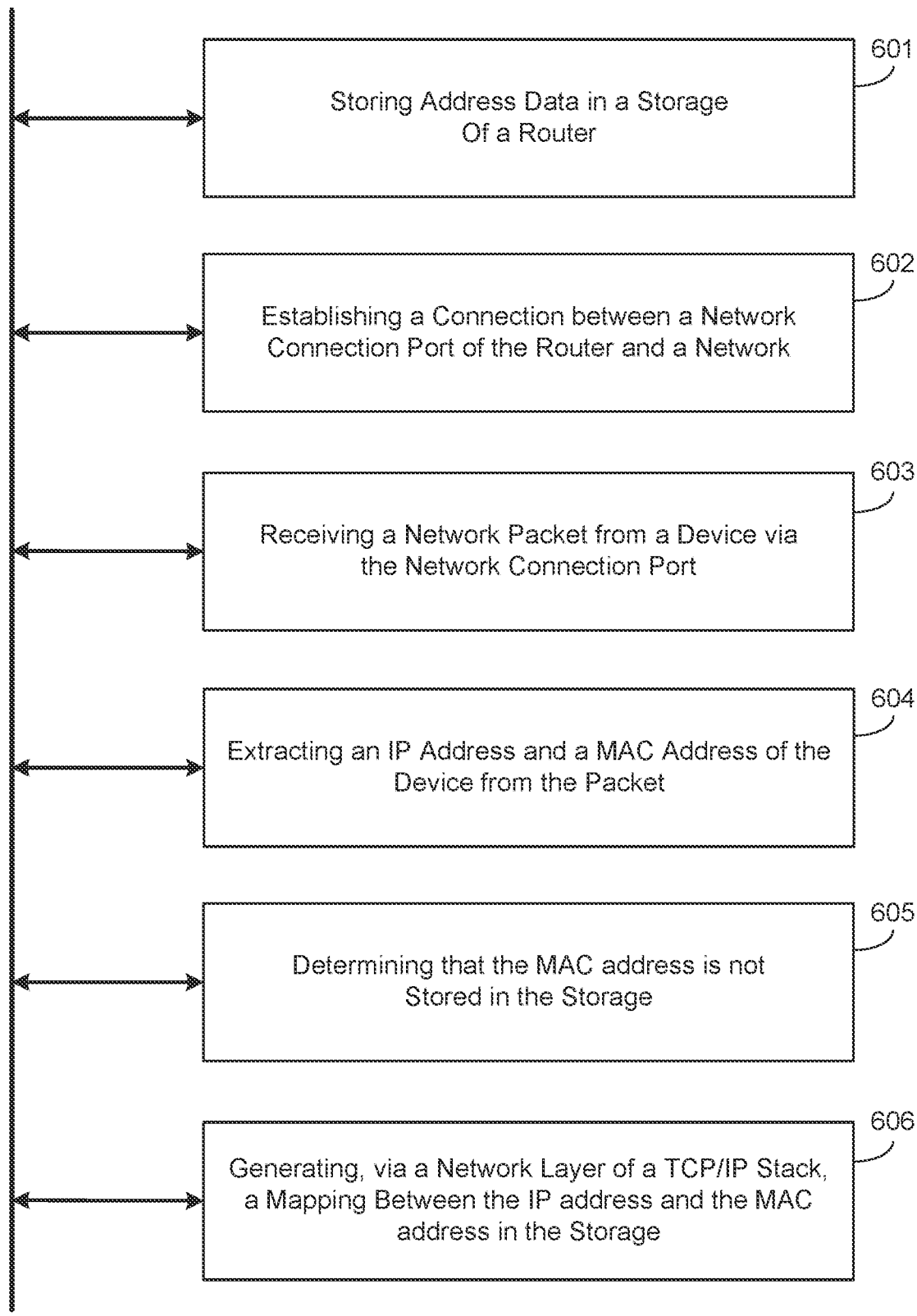

EXTENSIONS TO WIREGUARD FOR ADDRESS ASSIGNMENT AND ROUTE ANNOUNCEMENT

BACKGROUND

One of the benefits of a router is that it allows for connectivity between different devices and networks. For example, multiple devices can be connected to the Internet and to each other through a single router. In a home environment, a router can connect multiple devices such as laptops, smartphones, tablets, televisions, smart wearables, vehicles, and the like, to the internet and allow them to communicate with each other. In a business environment, routers can be used to connect multiple computers and servers to the Internet and to each other, allowing for seamless communication between employees and users outside the business.

Routers can be used to establish a virtual private network (VPN). There are different VPN protocols for establishing such a VPN. One such protocol is the WIREGUARD® protocol. Furthermore, routers can perform address resolution and management. This process typically requires storing a pairing between a media access control (MAC) address and an Internet Protocol (IP) address of the devices on a network of the router.

SUMMARY

One example embodiment provides an apparatus that includes one or more of a storage configured to store a public key and a private key of a router, one or more network connection ports, and a processor configured to transmit the public key of the router to a remote device and receive a public key of the remote device during a public key exchange, activate a virtual private network (VPN) on the network connection port based on the public key exchange, select an Internet Protocol (IP) address for the remote device, and encrypt a packet with the IP address based on the public key of the remote device and transmit the encrypted packet to the remote device via the VPN.

Another example embodiment provides a method that includes one or more of storing a public key and a private key of a router, connecting to a network through one or more network connection ports of the router, transmitting the public key of the router to a remote device and receiving a public key of the remote device via a network connection port during a public key exchange, activating a virtual private network (VPN) on the network connection port based on the public key exchange, selecting an Internet Protocol (IP) address for the remote device, and encrypting a packet with the IP address based on the public key of the remote device and transmitting the encrypted packet to the remote device via the VPN.

A further example embodiment provides a computer-readable medium comprising instructions, that when read by a processor, cause the processor to perform one or more of storing a public key and a private key of a router, connecting to a network through one or more network connection ports of the router, transmitting the public key of the router to a remote device and receiving a public key of the remote device via a network connection port during a public key exchange, activating a virtual private network (VPN) on the network connection port based on the public key exchange, selecting an Internet Protocol (IP) address for the remote device, and encrypting a packet with the IP address based on the public key of the remote device and transmitting the encrypted packet to the remote device via the VPN.

BRIEF DESCRIPTION OF THE DRAWINGS

FIG. 6 is a diagram illustrating a method of managing router traffic through a network protocol layer of a TCP/IP stack according to example embodiments.

DETAILED DESCRIPTION

Figure 1A:
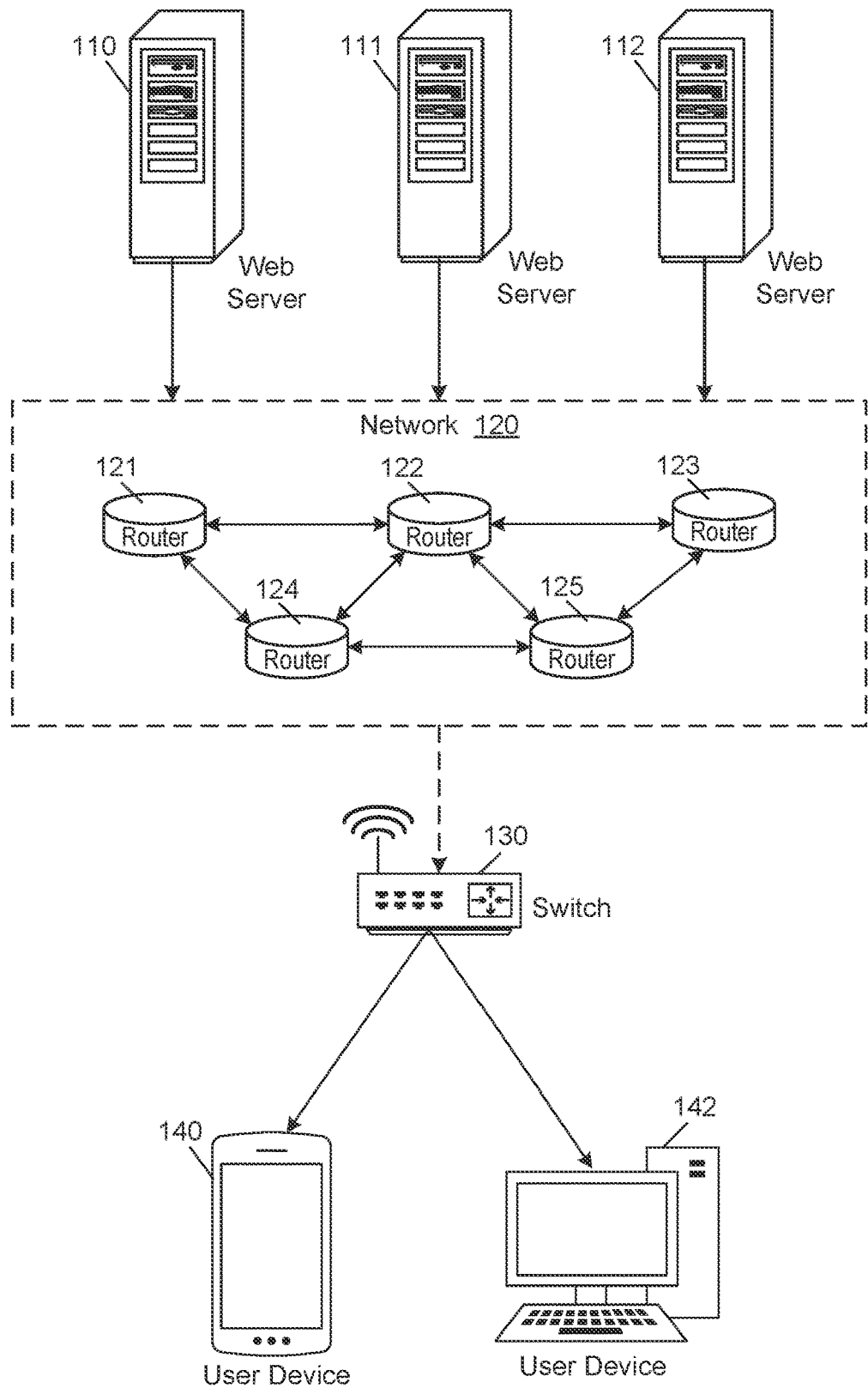
FIG. 1A is a diagram illustrating a network computing environment including a plurality of routing apparatuses according to example embodiments.

It is to be understood that although this disclosure includes a detailed description of cloud computing, implementation of the teachings recited herein is not limited to a cloud computing environment. Rather, embodiments of the instant solution are capable of being implemented in conjunction with any other type of computing environment now known or later developed.

The example embodiments are directed to a routing apparatus (also referred to herein as a router, etc.) The router may be geared for gigabit Internet, and also designed to accommodate future generation speeds. For example, the router may include multiple Ethernet ports that have a 1 Gbps Ethernet capacity or more. The router may enable thousands of connected devices and may collect and store activity data of the connected devices. The router may include a dual-channel memory and may support both Internet Protocol version four (IPv4) which uses a 32-bit address and Internet Protocol version six (IPv6) which uses a 128-bit address. The router can support multiple separate local area networks (LANs) at the same time, may isolate a guest Wireless Fidelity (WiFi) network, and may support multiple virtual LANs (VLANs) with automatic internal mapping. The router may assign each connected device an IP address. The router may perform port forwarding by device name. The router may also support multiple Internet connections for redundancy and load balancing.

The router may include a built-in firewall, and may protect all devices from threat-ware, malware, phishing, ransomware, and viruses. The router may be configured to pause Internet access to any device. Furthermore, the router may be configured to temporarily quarantine a new device when it joins the network. The router may perform content filtering, web search filtering, safe search, intrusion prevention, and the like. The router may also perform automatic virtual private network (VPN) self-configuring, and the like.

A VPN is a digital tool that hides peer IP addresses and protect Internet traffic from unwanted exposure. Through a VPN, Internet traffic travels along encrypted tunnels between two peers (e.g., a client and a server, etc.) The speed at which data is encrypted and decrypted, and the level of security provided, is in large part determined by the type of VPN protocol used.

There are many VPN protocols available today with differing benefits and drawbacks. WIREGUARD® is an example of a VPN protocol which includes a collection of rules that determine how data is encrypted and moved within a VPN. WIREGUARD® is notable for a few reasons because it works very quickly, provides a high level of security, and is written with relatively few lines of code in comparison to other VPN protocols. However, there are various deficiencies in the WIREGUARD® protocol. For example, WIREGUARD® fails to provide a process for securely exchange public keys between peers. The public keys are needed to establish the encryption for the VPN tunnel. Further, the WIREGUARD® protocol is also silent with respect to IP address assignment and dynamic route announcement.

According to various embodiments, provided herein are extensions to the WIREGUARD® protocol including a secure public key exchange process between two peers, an IP address assignment, and a dynamic route announcement process. The IP address assignment and the dynamic route announcement may be performed through the established VPN. For example, peers such as a client and a server that are participating in a VPN tunnel, may perform a public key exchange using a shared secret (known in advance). This enables the peers to exchange their public keys with each other in a manner that cannot be understood by an unauthorized listener that does not have access to the shared secret. The public key exchange can be used to generate the VPN tunnel (i.e., establish an encrypted tunnel between the peers).

Furthermore, the example embodiments also enable an IP address assignment that can be performed through the VPN tunnel. Likewise, the example embodiments also enables a route announcement protocol that can also be performed through the VPN tunnel. These features are absent from the WIREGUARD® protocol and can greatly benefit the efficiency of the VPN process. The public key exchange may be performed only once, during the initial setup between the peers while the IP assignment and the route announcement may be performed each time the peers restore the VPN connection.

Meanwhile, Address Resolution Protocol (ARP) is a protocol that may be performed by a router to map dynamic IP addresses to physical machine addresses (i.e., Media Access Control (MAC) addresses) of devices the exist on a local area network (LAN). For example, ARP can be used to translate a 32-bit IP address into a 48-bit MAC address, and vice versa. Here, the router may maintain a cache or other storage which includes mappings of IP addresses to MAC addresses for all devices on the network. ARP works between the Data Link Layer (Layer 2) and the Network Layer (Layer 3) of the Open Systems Interconnection (OSI) model.

When a new computer joins the LAN, the router may assign it a unique IP address for identification and communication. When an incoming packet destined for a machine on the LAN arrives at the router, the router may ask the ARP layer to find a corresponding MAC address that is mapped to the IP address included in the packet. However, this process requires both the Layer 2 (data link layer) and the Layer 3 (IP layer) to work together because ARP is a process performed by the Layer 2 protocol while MAC addresses are managed by the Layer 3 protocol. As a result, this process can be inefficient.

The example embodiments provide an address management protocol that avoids the Layer 2 protocol and instead performs everything via the Layer 3 protocol (network layer). Instead of performing ARP scanning of the available devices on the network, the router can wait for a packet to arrive, and inspect the IP address and the MAC address included in the packet. If the IP address is new (i.e., not stored in the cache) the router can add a new entry/mapping into the cache that includes the IP address mapped to the MAC address. When the router subsequently receives a second packet with a different IP address but the same MAC address that already exists in the cache, the router can ignore the second packet and not respond, thereby preventing its identity from being known. In doing so, the router can prevent what is typically referred to as "ARP spoofing."

FIG. 1A illustrates a network computing environment 100 including a plurality of routing apparatuses (e.g., routers) according to example embodiments. Referring to FIG. 1A, the network computing environment 100 includes a plurality of web servers that provide content to a plurality of user devices. In this example, a web server 110, a web server 111, and a web server 112 may provide different types of content including emails, videos, chat, social media, video games, and the like, to a user device 140 and a user device 142 via a network of routers 120. In this example, the network of routers 120 includes a router 121, a router 122, a router 123, a router 124, and a router 125. Any of the routers within the network of routers 120 may embody the WIREGUARD® protocol extensions and/or the Layer 3 address management protocols described herein.

For example, the web server 110 may send packets of data to the user device 140 via the network of routers 120. In this example, one or more of the routers in the network of routers 120 may receive and route the packets until it reaches the user device 140. For example, a router 121 may receive the packets from the web server 110 and route the packets to the router 124. Here, the router 121 may select/choose the best path for the packets through the network. In response to receiving the packets, the router 124 may then route the packets to a switch 130, which then delivers the packets to the user device 140. The source and destination of the packets may be included in the packets and may be used by the network of routers 120 and the switch 130 to deliver the packet to the appropriate device (the user device 140).

Each of the routers in the network of routers 120 may store a routing table which includes all of the available paths in the network of routers 120. A router may look at the destination IP address in the packet and determine the fastest path through the network of routers 120 based on the routing table and metric values determined by the router. Furthermore, any of the routers within the network of routers 120 may perform the methods and processes described herein. For example, a router may automatically configure a VLAN interface, may enable direct access to a remote device, and/or may transparently replace an existing router on the network without a need for manual configuration.

The example of FIG. 1A could refer to a home environment or the like. It should also be appreciated that the routers described herein may be used in an office environment. In this example, the routers may connect not only user devices, but also other servers, and the like.

Figure 1B:
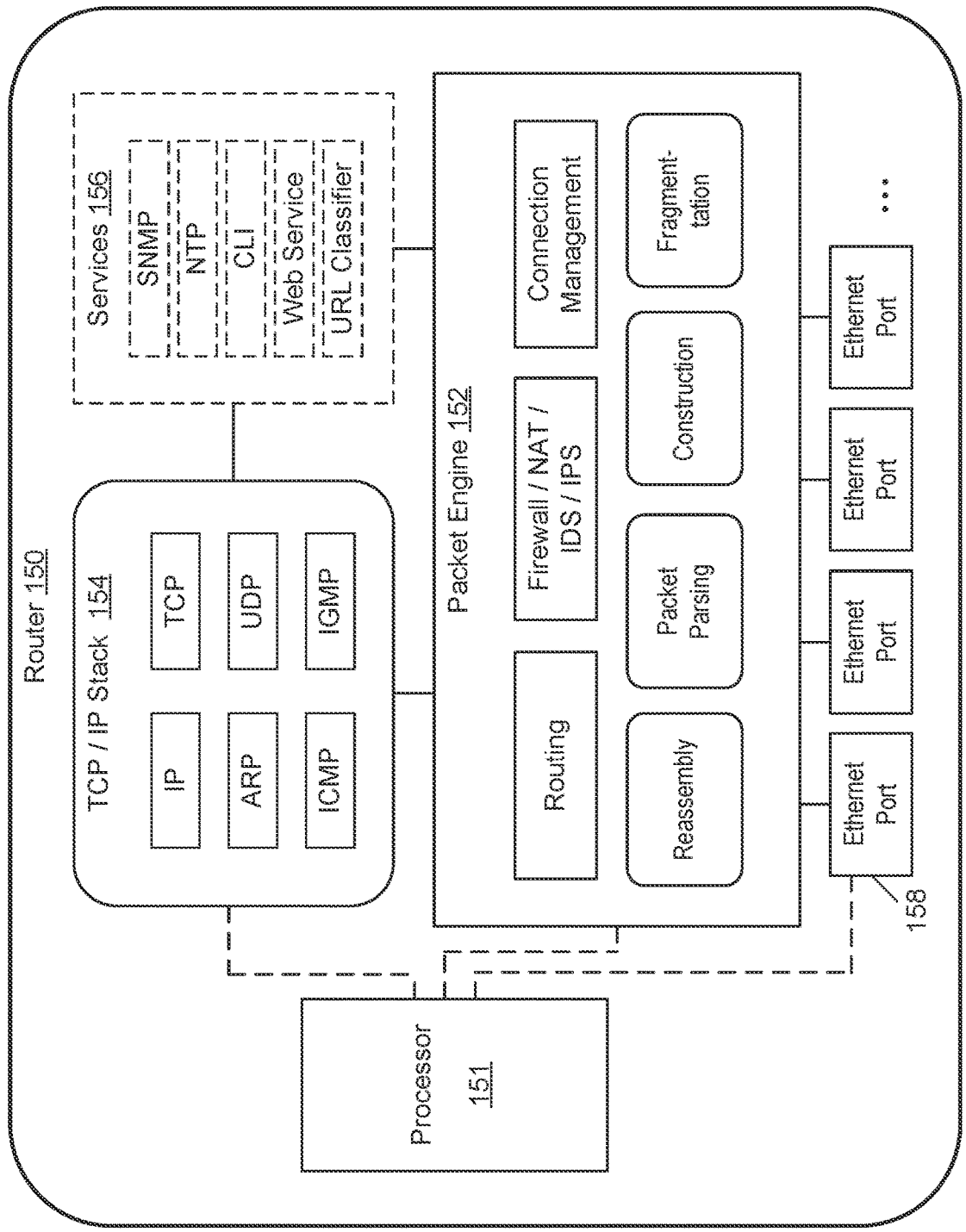
FIG. 1B is a diagram illustrating components that may be included in a routing apparatus according to example embodiments.

FIG. 1B illustrates components that may be included within a routing apparatus (i.e., a router 150) according to example embodiments. Referring to FIG. 1B, the router 150 includes a processor 151 such as a central processing unit (CPU) that helps each of the other components of the router 150 perform their function. The router 150 also includes a packet engine 152, a transmission protocol/Internet protocol (TCP/IP) stack 154, and a plurality of Ethernet ports 158. In this example, the packet engine 152 is responsible for processing packets as they are received through an ingress port (e.g., an Ethernet port 158) and output via an egress port. The TCP/IP stack 154 is responsible for ensuring that various protocols are enforced on packets from ingress to egress. The packet engine 152 and/or the TCP/IP Stack 154 may perform services 156 on packets that pass through the router 150 including, but not limited to, implementing a Simple Network Management Protocol (SNMP), implementing Network Time Protocol (NTP), providing and managing a command line interface (CLI), managing a web service that is accessible to external devices, and a uniform resource locator (URL) classifier.

According to various embodiments, the packet engine 152 may perform routing on a packet based on a destination IP address of the packet, may implement a firewall, perform network address translation (NAT), perform an intrusion detection system (IDS), perform an intrusion prevention system (IPS), and the like. The packet engine 152 may also perform a connection management function to control automatic failover, monitor client connections, direct requests to appropriate servers, act as a proxy server, handle client/server communications, and prioritize connections between application servers. The packet engine 152 may also perform reassembly on fragments of a packet as it arrives and apply ACLs and NATs to the packet once it is reassembled, packet parsing, construction, and fragmentation of packets into smaller pieces so that resulting pieces can pass through a link with a smaller maximum transmission unit.

In some embodiments, the packet engine 152 may also manage autoconfiguration for IPV4 which enables devices to connect to the Internet automatically assign themselves an IP address, device management which displays views of router configuration and performance such as to an external device, virtual private networks (VPNs), routing information protocol (RIP), Universal Plug and Play (UPnP) to enable compliant devices to automatically set port forwarding rules, simple service discovery protocol (SSDP) which enables a device to advertise its services to other devices, a Domain Name System (DNS) which enables translation of domain names to machine-readable IP addresses, a hostname cache which can be used by the DNS store hostnames and IP address pairings, category enforcement which enables blocking of categories of DNS, device pause, and the like.

Furthermore, the packet engine 152 may also control and manage dynamic host configuration protocol (DHCP) including DHCP client and DHCP server functions. DHCP can be used to assign IP addresses to DHCP clients and allocate TCP/IP configuration information to DHCP clients. This information includes subnet mask information, default gateway IP addresses, and DNS addresses. In some embodiments, the router 150 may serve as a DHCP server that assigns IP addresses to clients connected to the router 150.

In one embodiment, the system integrates machine learning capabilities within a routing apparatus, particularly the packet engine component. The system empowers the router with the ability to dynamically adapt and optimize its routing decisions in response to evolving network conditions and traffic dynamics. For instance, the packet engine continuously monitors the flow of incoming packets and analyzes the patterns of outgoing traffic, leveraging machine learning algorithms to discern trends and patterns. Through this analysis, the router prioritizes certain types of traffic, such as time-sensitive data or high-bandwidth applications, ensuring that critical packets are delivered promptly while optimizing overall network performance. The router also utilizes predictive analytics to forecast potential network congestion points or areas susceptible to failure based on historical data and current trends. By preemptively rerouting traffic away from these areas or dynamically adjusting Quality of Service (QOS) parameters, the router proactively mitigates potential disruptions and maintains smooth network operation. Additionally, the router leverages communication protocols to exchange information with neighboring routers, sharing insights on network conditions and collaboratively optimizing routing decisions. The machine learning capabilities enable the router to learn from past experiences and adapt its routing strategies, accordingly, continuously improving its performance. For example, the router can analyze the effectiveness of previous routing decisions and adjust its algorithms to optimize future routing paths. Additionally, the router incorporates feedback mechanisms to receive input from network administrators or end-users, refining its routing policies based on real-world observations and user preferences.

In one embodiment, the system comprises several components working to establish a secure communication network. Firstly, a storage unit within the apparatus is configured to store both the public key of the router and its corresponding private key. These keys are crucial for encrypting and decrypting messages exchanged within the network. The apparatus also includes one or more network connection ports, facilitating the physical connection between the router and other devices or networks. The system contains a processor, which manages the communication process. The system transmits the public key of the router to a remote device, initiating a public key exchange process. The exchange establishes a secure communication channel between the router and the remote device. Once the public key of the remote device is received, the system activates a virtual private network (VPN) on a network connection port based on the exchange. The VPN ensures that the communication between the router and the remote device is encrypted and secure. Subsequently, the processor selects an Internet Protocol (IP) address for the remote device, allowing it to be uniquely identified within the network. Finally, the system encrypts a packet with the IP address based on the public key of the remote device and transmits the encrypted packet to the remote device via the VPN, ensuring that the communication between the router and the remote device remains confidential and tamper-proof.

Figure 2A:
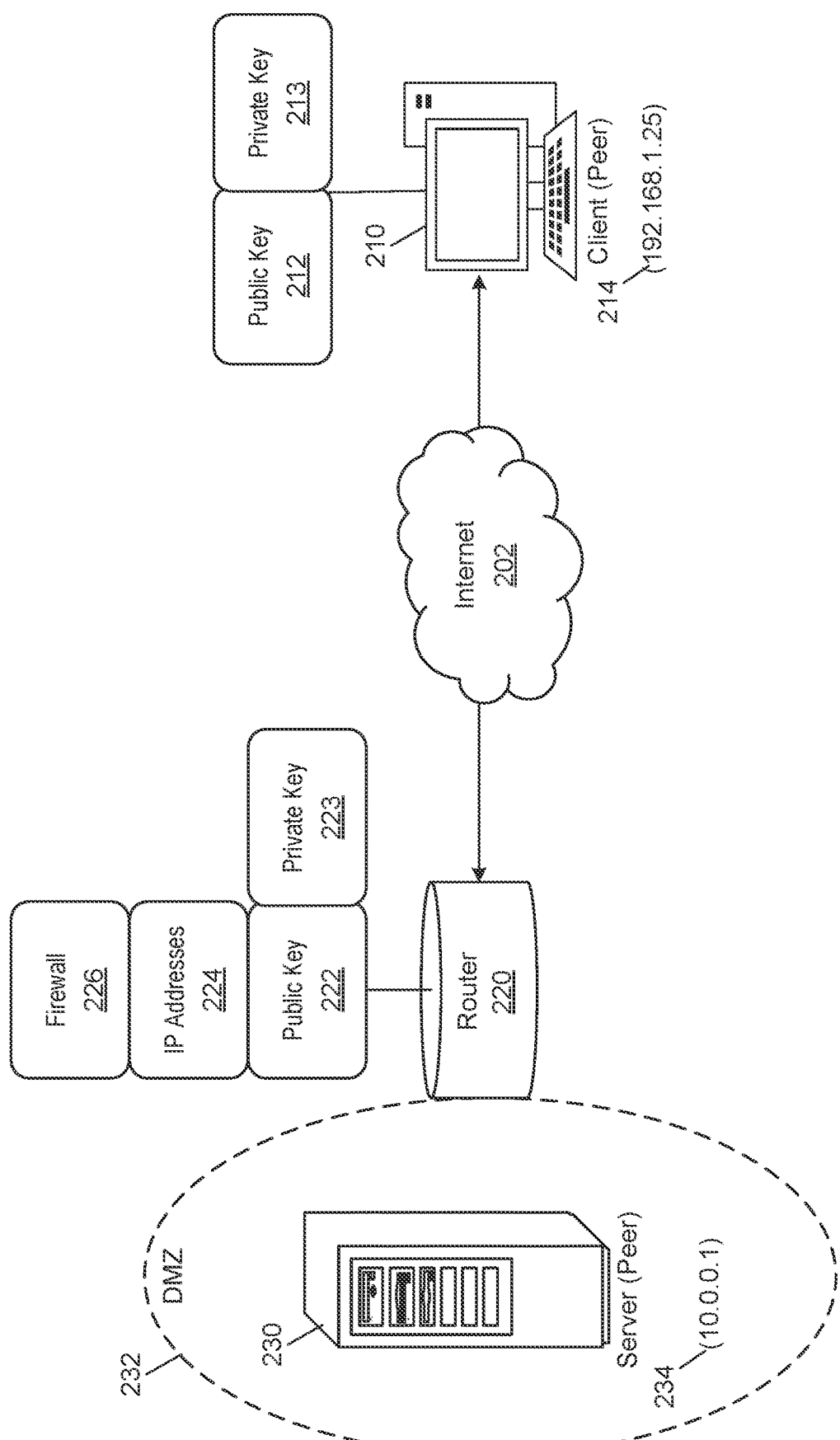
FIGS. 2A-2D are diagrams illustrating public key exchange, IP address assignment, and dynamic route announcement within a VPN protocol according to example embodiments.

FIGS. 2A-2D illustrate a public key exchange, an IP address assignment, and dynamic route announcement within a VPN protocol according to example embodiments. The examples described with respect to FIGS. 2A-2D may be integrated into a WIREGUARD® VPN protocol. For example, FIG. 2A illustrates a process 200A of a client 210 connecting to a server 230 via a router 220. In this example, the client 210 may connect to the router 220 via a network such as the Internet 202. The router 220 may assign an IP address 234 to the server and an IP address 214 to the client 210 when the devices are initially connected to the router 220 or re-connected to the router 220. The IP addresses may be used for Internet and network traffic.

In this example, the router 220 provides a firewall 226 that protects traffic into and out of the server 230. Through this, the router 220 may create a demilitarized zone (DMZ) 232 around the server 230. In this example, the server 230 may refer to an office server, while the client 210 may refer to an employee who is remotely connecting to the office. However, this is just one example. The DMZ 232 is a perimeter network that protects and adds an extra layer of security to an organization's internal local-area network (LAN) from untrusted traffic. The WIREGUARD® protocol views refers to the server 230 and the client 210 as "peers".

In this example, the router includes a public key 222 and a private key 223. The keys may be part of a symmetric key pair that is generated by the router 220, added to the router 220 from an external device, etc. Meanwhile, the client 210 also includes a public key 212 and a private key 13. To establish a WIREGUARD® VPN, both peers must have the public keys of the others. However, WIREGUARD® does not provide a protocol by which peers share their public keys.

Figure 2B:
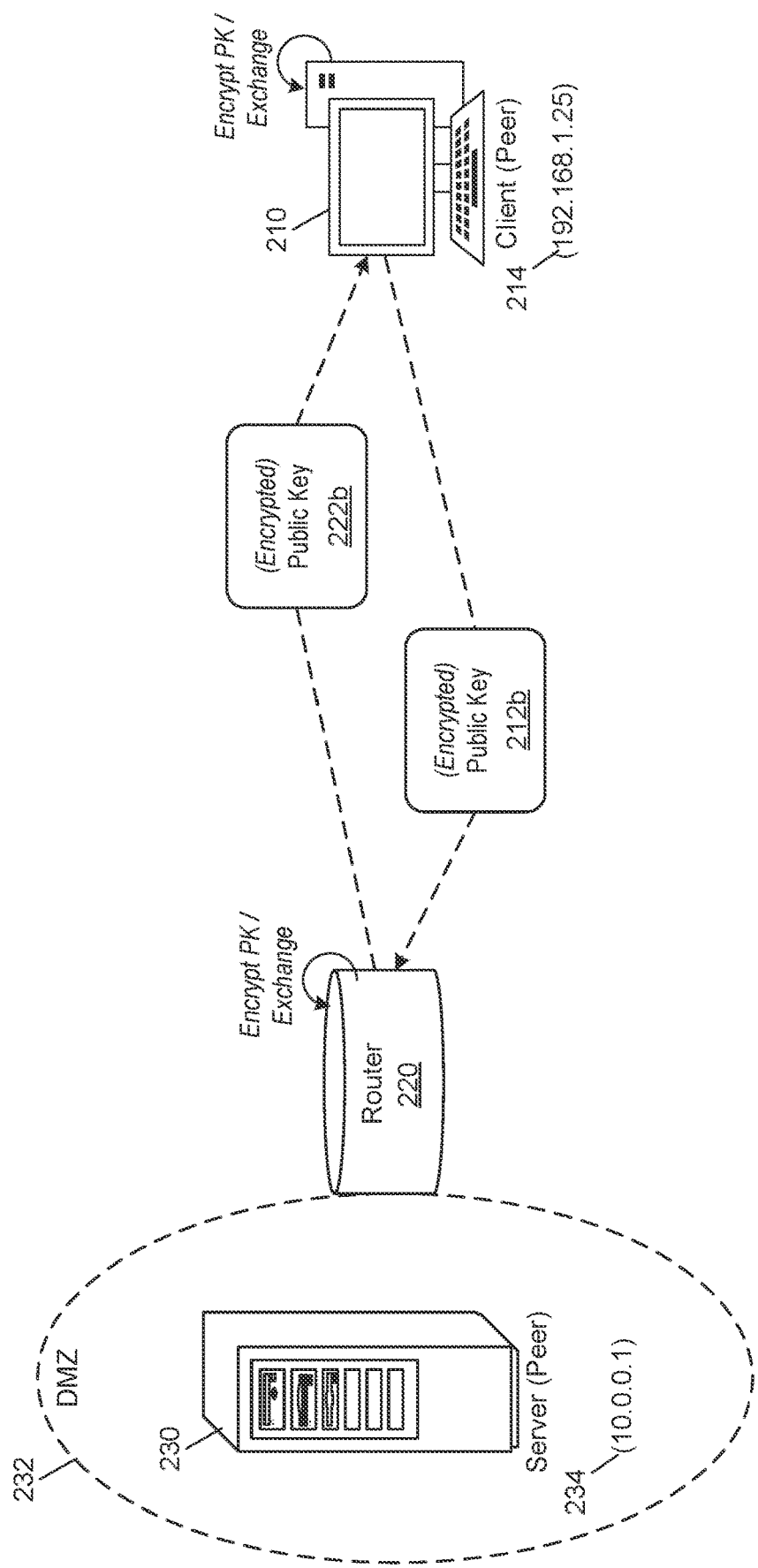

FIG. 2B illustrates a process 200B of a public key exchange performed between the router 220 and the client 210 according to various embodiments. In this example, the router 220 and the client 210 may be provided with a shared secret. The shared secret may be installed on the router 220 and the client 210, or it may be otherwise provided to the router 220 and the client 210 though any known means. To securely share the public keys, the router 220 may encrypt the public key 222 of the router 220 to generate an encrypted public key 222b. The encrypted public key 222b may be transmitted to the client 210. Here, the client 210 may use the shared secret to decrypt the encrypted public key 222b of the router 220 and obtain the public key 222 of the router 220. Likewise, the public key 212 of the client 210 may be encrypted with the shared secret and an encrypted public key 212b may be sent to the router 220. In response, the router 220 may decrypt the encrypted public key 212b with the shared secret to obtain the public key 212 of the client 210.

Public Key Exchange is a separate and distinct protocol. The key exchange may be performed via a User Datagram Protocol (UDP) protocol so that it's non-discoverable. In other words, a peer that supports this protocol simply ignores any malformed or otherwise incorrect packet, so it can't be determined via probe that a given Internet endpoint supports the protocol.

The recipient decrypts the packet using its hashed key. If the packet does not authenticate, it is silently discarded. If the packet does authenticate, then the key matches that of the sender. The recipient then prepares its version of the same packet and transmits it back to the sender. The protocol is simple: if the sender does not receive a reply, it simply retransmits the packet until it exhausts its attempts (usually three attempts one second apart). If the packet is lost in transit from sender to recipient, then the retransmission will hopefully be successful. If the recipient receives the packet and transmits a response and the response is lost, the original sender will simply not receive the reply and will re-transmit. Thus, the recipient will simply receive a second packet, which does no harm. In both cases, upon receiving an authentic packet, the device can be configured automatically, to have a new VPN using the peer's public key and other associated data. There are additional security features provided, for example, the recipient can be configured whether or not to implicitly trust any peer sending a packet, even if it's authentic. If not, the VPN tunnel can be created, but placed in a "pending approval" state such that it will not become active until reviewed and approved by, presumably, a human operator.

Figure 2C:
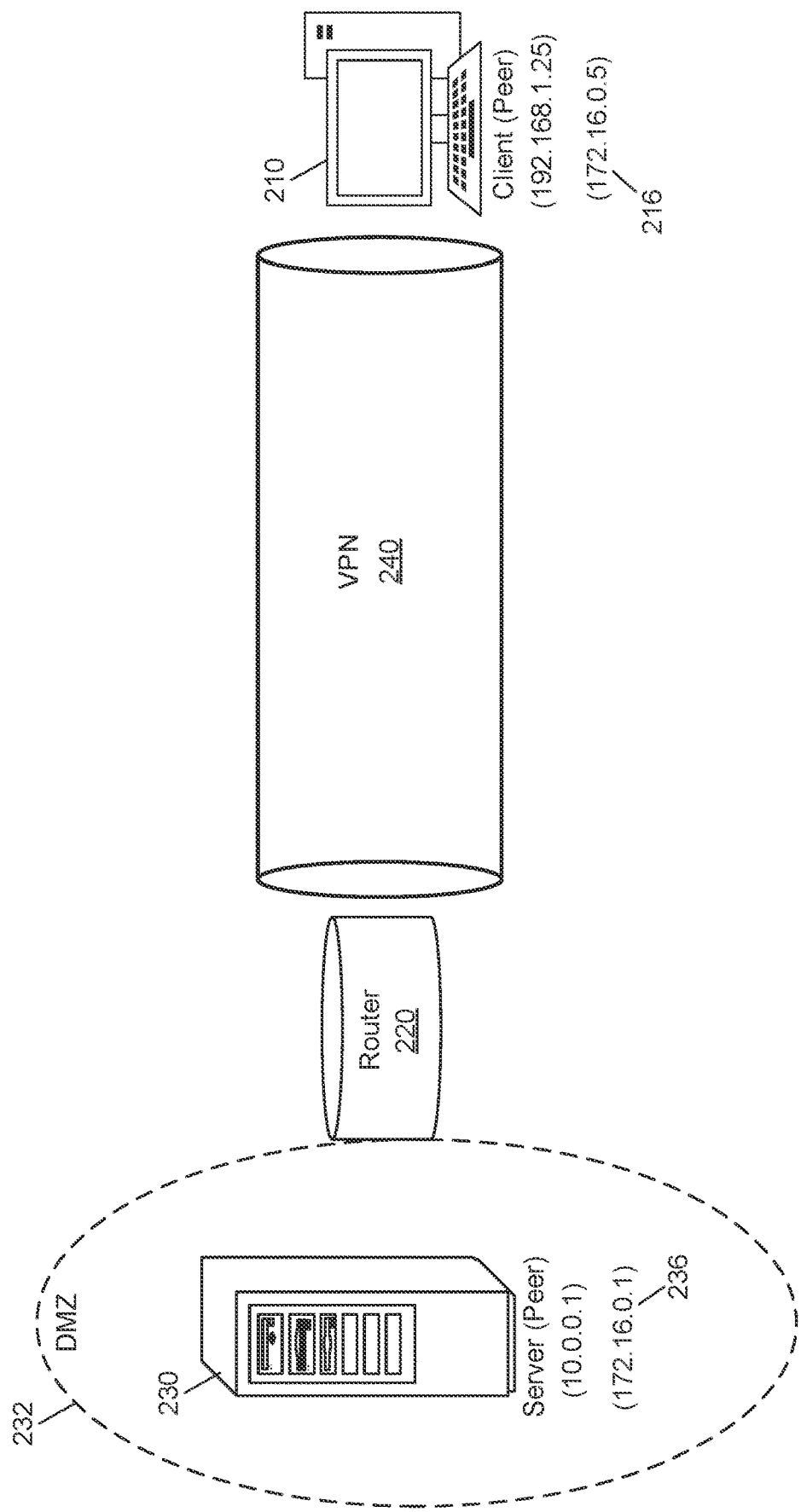

FIG. 2C illustrates a process 200C of establishing a VPN tunnel 240 between the router 220 and the client 210 based on the public key exchange. Now that the public keys have been exchanged, the client 210 may encrypt packets sent to the router 220 using the public key 222 of the router 220. In response, the router 220 may use the private key 223 to decrypt the encrypted packets from the client 210. Meanwhile, the router 220 may encrypt packets sent from the server 230 to the client 210 using the public key 212 of the client 210. In response, the client 210 may use the private key 213 to decrypt the encrypted packets from the server 230. As such, the VPN tunnel 240 is created by the encryption process.

The router 220 may establish a new IP address 236 for the server 230 that is different from the actual IP address 234 of the server 230. Furthermore, the router 220 may establish a new IP address 216 for the client 210 that is different than the actual IP address 214 of the client 210. Here, the new IP address 236 and the new IP address 216 can be used to hide the actual IP addresses of the devices, and may appear to be from a physical location of the server, or the like.

Figure 2D:
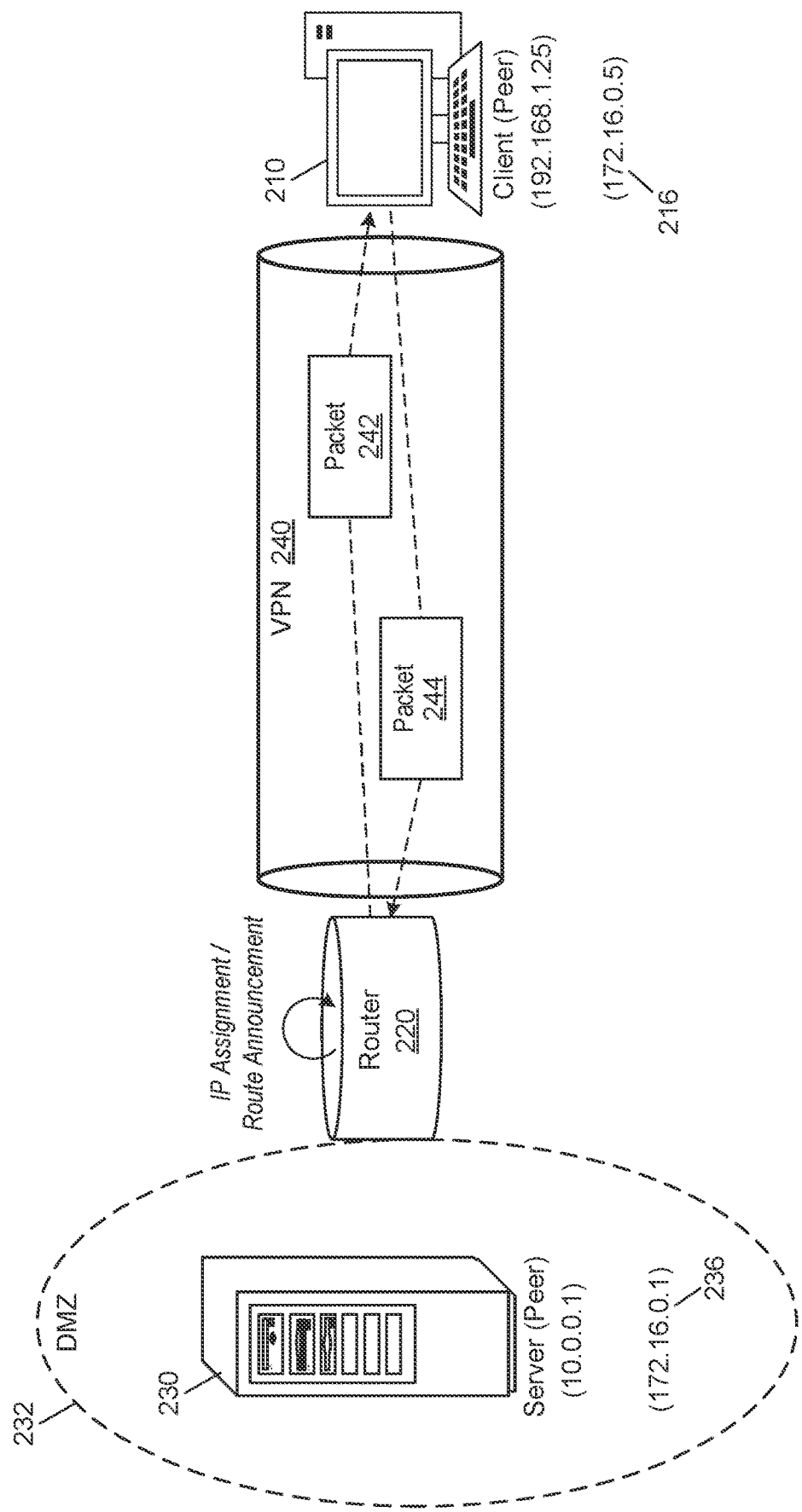

FIG. 2D illustrates a process 200D of an IP assignment process and a dynamic route announcement process that is performed through the VPN tunnel 240 that has been established between the server 230 and the client 210. When the VPN tunnel 240 becomes active, the IP address assignment and route announcement protocol may be activated by either of the peers through the VPN tunnel 240. Either peer may send a packet through the VPN tunnel 240.

For example, in FIG. 2D, the router 220 may send a packet 242 according the UDP protocol through the VPN tunnel 240. The packet 242 may be encrypted using the public key 212 of the client 210. Within the packet 242 can be IP address assignment data and route announcement data. For example, the packet 242 may contain a type, a transaction ID, an IPV4 address assignment or an IPV6 assignment, a count of number of routers being announced, an array of routes being announced (e.g., which may include an IPV6 address and number of bits for its prefix and subnet, etc.) If no response is received, the packet 242 can be retransmitted. When the protocol is first activated, an information packet may be transmitted three times at one-second intervals and if no response is received, it is assumed that the peer does not support this protocol and further communications using this protocol are disabled. The protocol is tolerant to glare, but normally one peer will delay transmitting briefly simply to avoid glare.

The sender may determine which IP address(es) it wishes the peer to use when communicating back to it and can also provide a list of network blocks that it is making available to the peer. For example, the router 220 may choose an IP address from a pool of IP addresses 224 (shown in FIG. 2A). Note that all fields are optional and address assignments and route announcements are not required. Upon receiving the packet 242, the client 210 can accept or reject the address assignment(s), depending on its configuration, and may prepare a response packet 244 (Info Reply) that contains the transaction ID from the received packet 242. If at any time, configuration or other conditions change, either peer may simply transmit a new packet and the recipient will configure itself accordingly and craft its associated reply.

Figure 3:
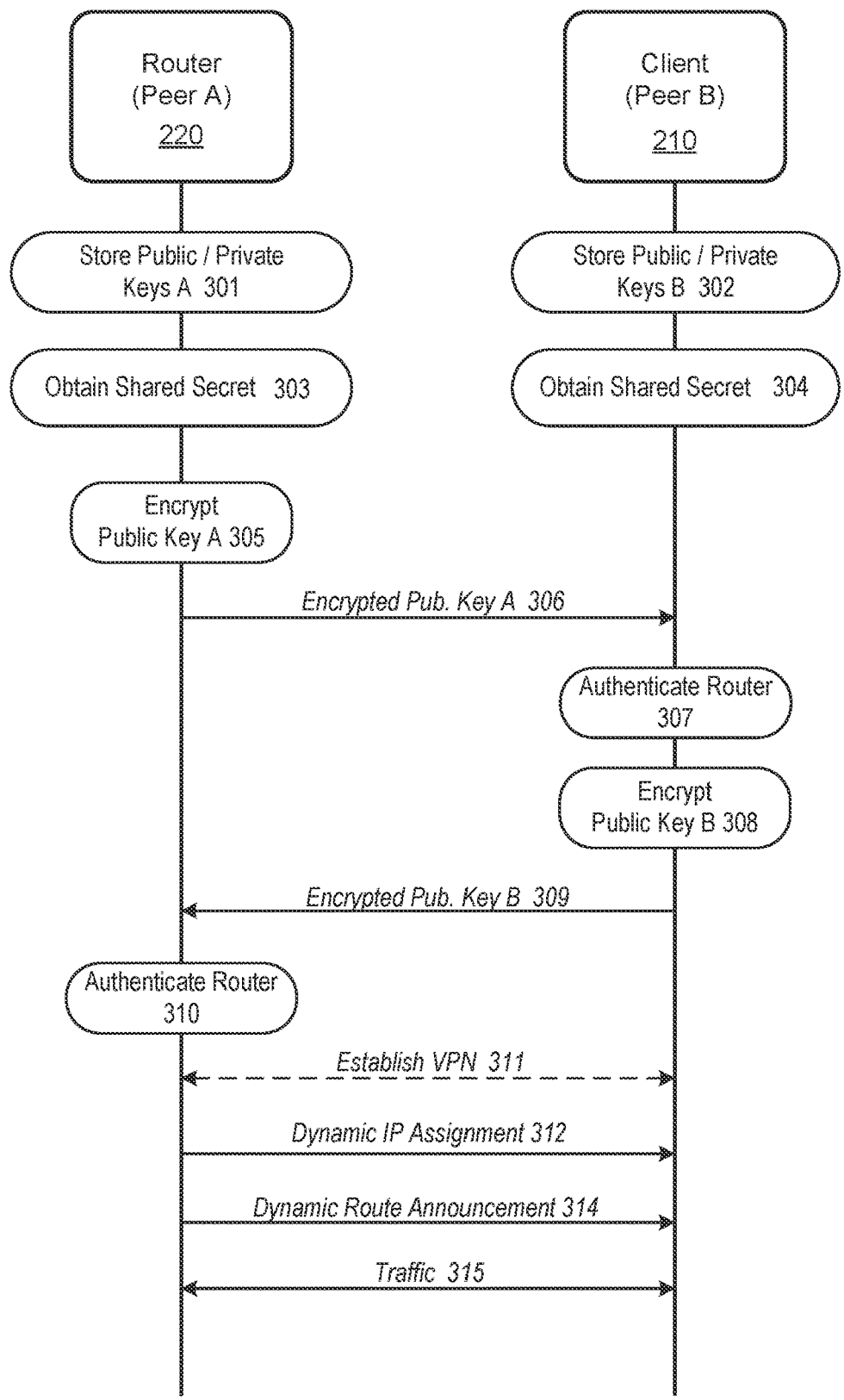
FIG. 3 is a diagram illustrating a process of establishing a VPN with modifications to an existing protocol according to example embodiments.

FIG. 3 illustrates a process 300 of establishing a VPN with modifications to an existing protocol, such as WIREGUARD®, according to example embodiments. Referring to FIG. 3, in 301 the router 220 may store a key pair that includes a public key and a private key. Likewise, in 302, the client 210 may store its own key pair that includes a public key and a private key. In 303, the router 220 may obtain a shared secret, such as from a central system, a user installing it, or any other known means. In 304, the client 210 may obtain the shared secret as well. Although these processes are shown as being performed in parallel in FIG. 3, it is not a requirement and the processes may be performed separately/at different times.

In 305, the router 220 may encrypt its public key using the shared secret and transmit the encrypted public key to the client 210 in 306. In 307, the client may decrypt the public key using the shared secret and authenticate the router 220 upon successful decryption. In this case, the client knows that the supplier of the public key knew the correct shared secret, and therefore, whatever public key is provided is assumed to be authentic.

In 308, the router may encrypt its public key using the shared secret and transmit the encrypted public key to the router 220, in 309. In 310, the router 220 may decrypt the encrypted public key using the public key of the client 210, and authenticate the client 210. Upon successful authentication of the router 220 and the client 210, the VPN is activated in 311. In 312, the router 220 selects an IP address for use with the VPN and sends it to the client 210. In 313, the router 220 sends a list of available routes/networks which are connected to the router 220 to the client 210. In 314, traffic can be exchanged between the router 220 and the client 210 through the VPN based on the assigned IP addresses.

Figure 4A:
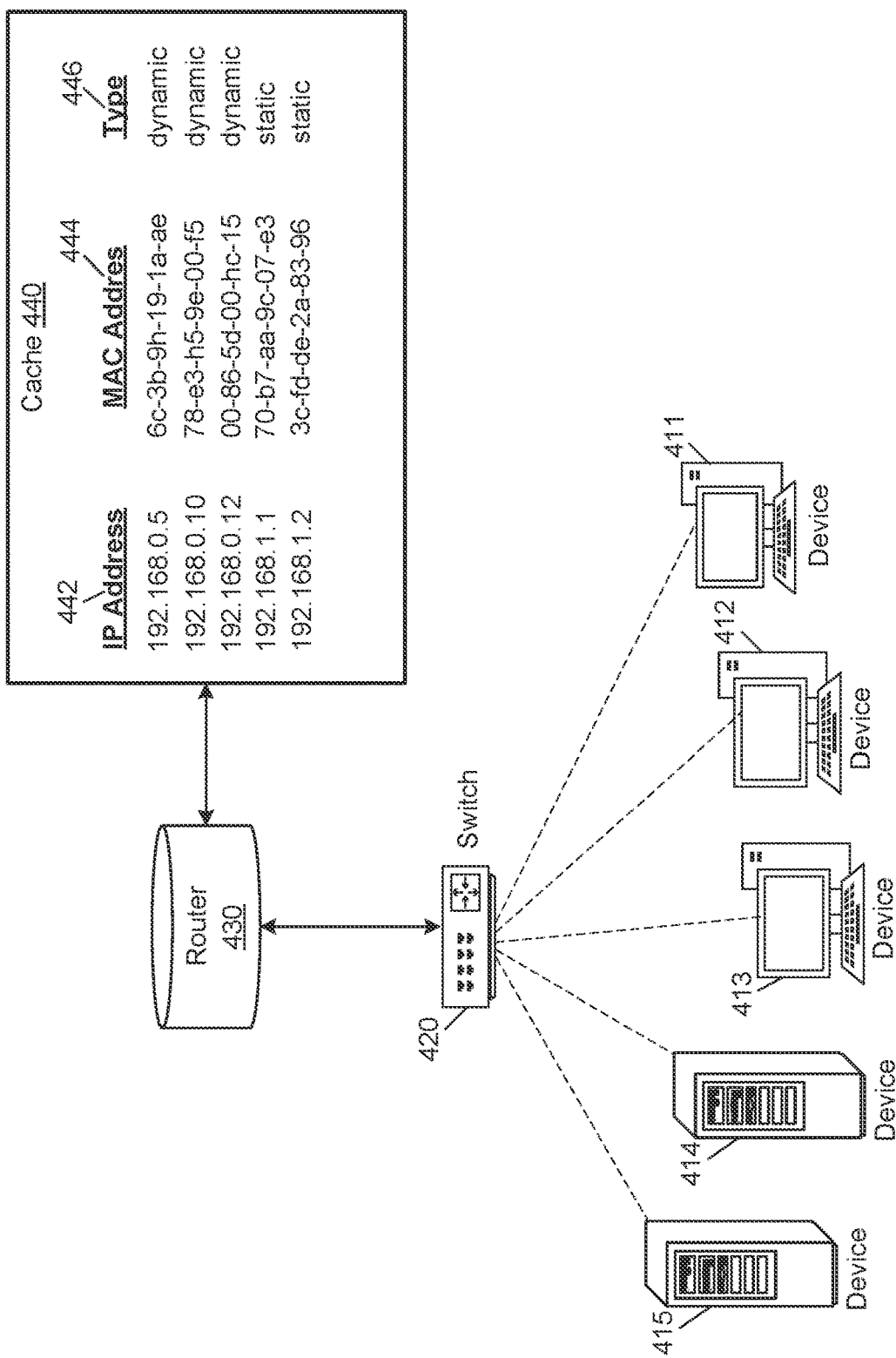
FIGS. 4A-4E are diagrams illustrating a process of route management through a network protocol layer of a transmission control protocol/Internet protocol (TCP/IP) stack according to example embodiments.

FIGS. 4A-4E illustrate a process of route management through a network protocol layer of a transmission control protocol/Internet protocol (TCP/IP) stack according to example embodiments. For example, FIG. 4A illustrates a process 400A of a router 430 that manages a local area network (LAN) including a plurality of user devices. In this example, a user device 411, a user device 412, a user device 413, a user device 414, and a user device 415 are part of a local area network (LAN) configured by a network switch 420. When the user devices need to reach the Internet or another network, they send packets to the Internet via the router 430 and the switch 420. In this example, the router 430 assigns IP addresses to the user devices upon detecting the user devices on the network. The IP addresses are then mapped to MAC addresses of the devices and stored within a cache 440. For example, the cache 440 may include a table, or the like, which stores each devices IP address mapped to the respective MAC address of the device. In this example, the cache 440 includes a first column 442 for IP addresses, a second column 444 for MAC addresses, and a third column 446 for types of IP address.

IPv4 devices typically employ an "ARP cache" which provides a mapping between IPv4 addresses and hardware addresses (typically, Ethernet MAC addresses). Address resolution protocol (ARP) is used to discover this relationship and the ARP cache remembers those relationships for some reasonable period of time. But ARP is subject to numerous attacks and requires periodic refresh. In addition, an ARP cache is normally demand-driven, i.e., when a packet needs to be transmitted to a given IP address, the ARP layer is consulted in order to map the IP address to the associated hardware address. If it's not known at that time, then an ARP probe is transmitted and the packet must be deferred until the ARP exchange is completed. The process requires continuous interaction between a layer 2 protocol and a layer 3 protocol of the router.

In the example embodiments, network scanning is a separate process that is used to determine the entrance and exit of devices from the network. A natural consequence of this process is that the IP/hardware relationships are discovered and maintained at all times. So when an IP packet is to be transmitted, the device map can be consulted and an ARP does not need to initiated. Instead, the cache 440 can be managed and populated using only a layer 3 protocol (IP Layser). In other words, the router 430 may not rely on ARP scanning to identify network devices. Instead, simply receiving an IP packet of any type that is sufficient to establish the IP/MAC relationship may be used by the router 430 to populate the cache 440. It's also possible than an ARP scan of the network can be performed, but it's not required for operation. It knows about a device simply because that device has communicated previously.

Figure 4B:
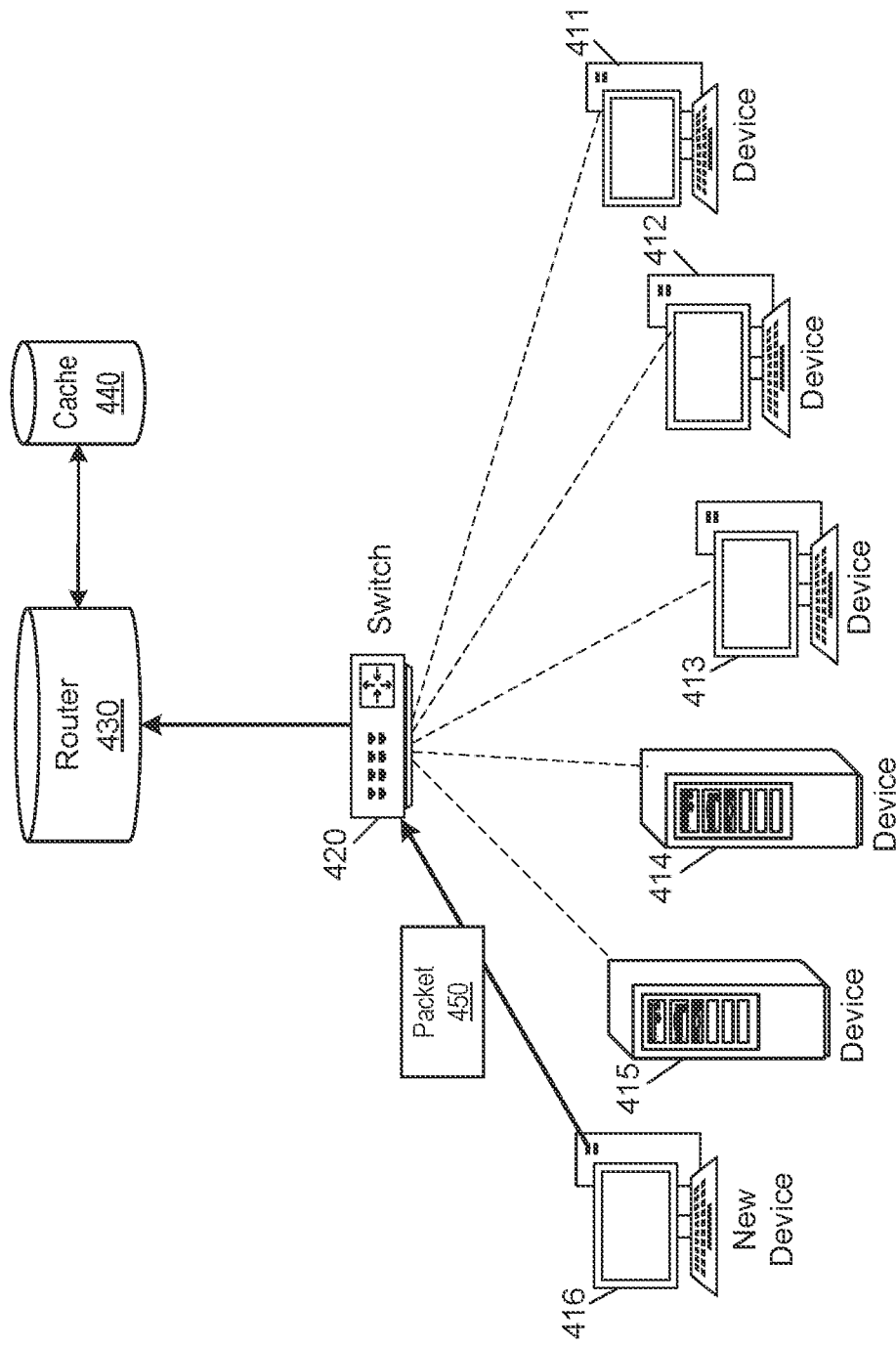
Figure 4C:
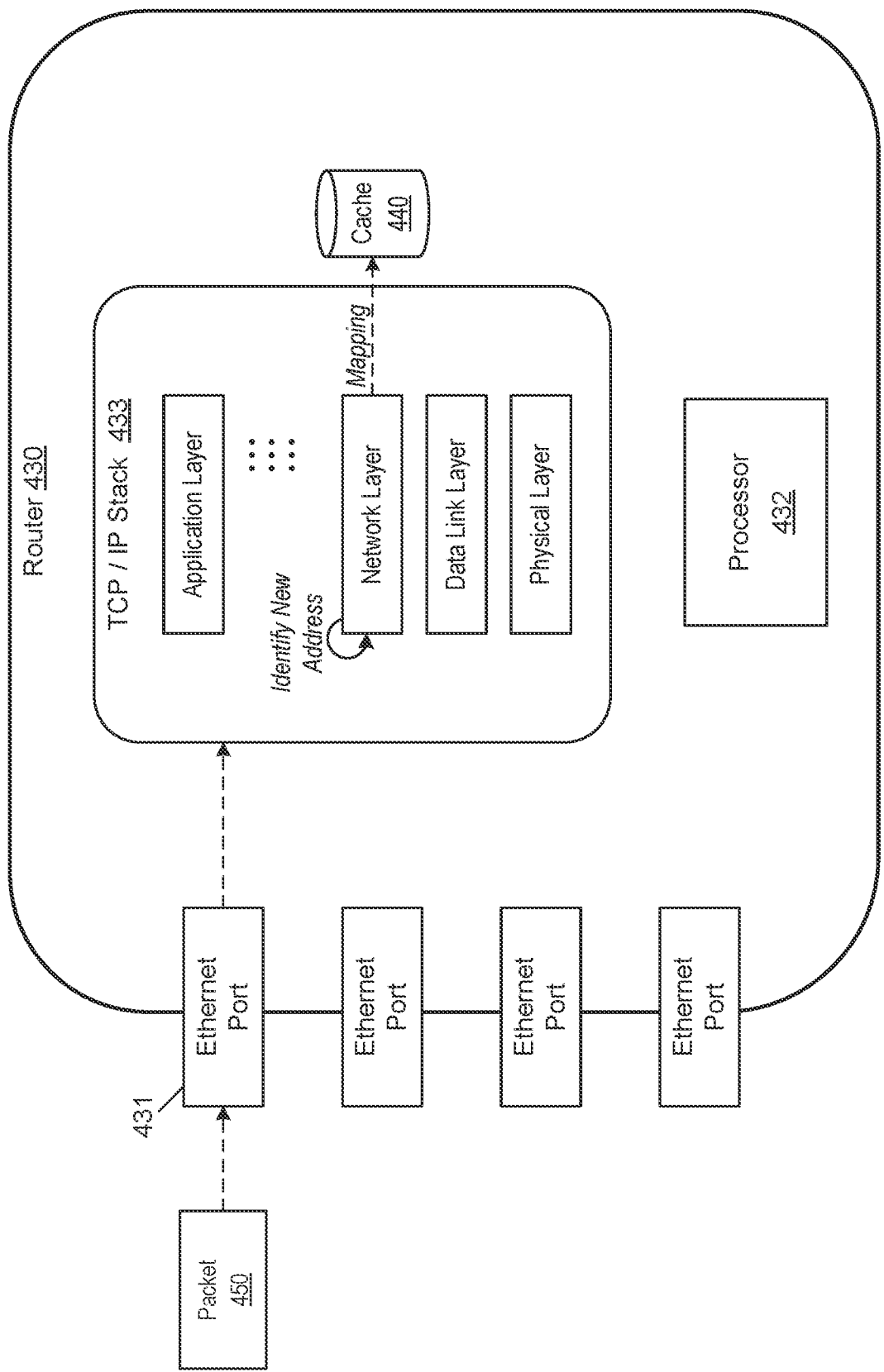

FIG. 4B illustrates a process 400B of a new device 416 on the LAN sending an initial packet 450 to the Internet via the router 430, and FIG. 4C illustrates a process 400C of the router 430 updating the cache 440 with addressing information of the new device 416 using a layer 3 protocol without using a layer 2 protocol. For example, the packet 450 may be any kind of packet that is sent from the new device 416. The packet 450 will inherently include an IP address of the sending device (the new device 416) and a MAC address of the new device 416.

In FIG. 4C, the packet 450 is received via a network connection port 431 of the router. In response, a processor 432 of the router 430 transfers the packet 450 to the TCP/IP stack 433 of the router 430. In response, a network layer (Layer 3) software program (i.e., an IP layer) may identify whether the MAC address is already stored in the cache 440. If not, the network layer may create a new mapping between the IP address and the MAC address of the new device 416 which are identified from the packet 450, and store the mapping within the cache 440. Here, the network layer can avoid the use of ARP, and also avoid the need to interact with a data link layer (Layer 2 protocol). Thus, the addressing performed by the router 430 can be greatly simplified.

Figure 4D:
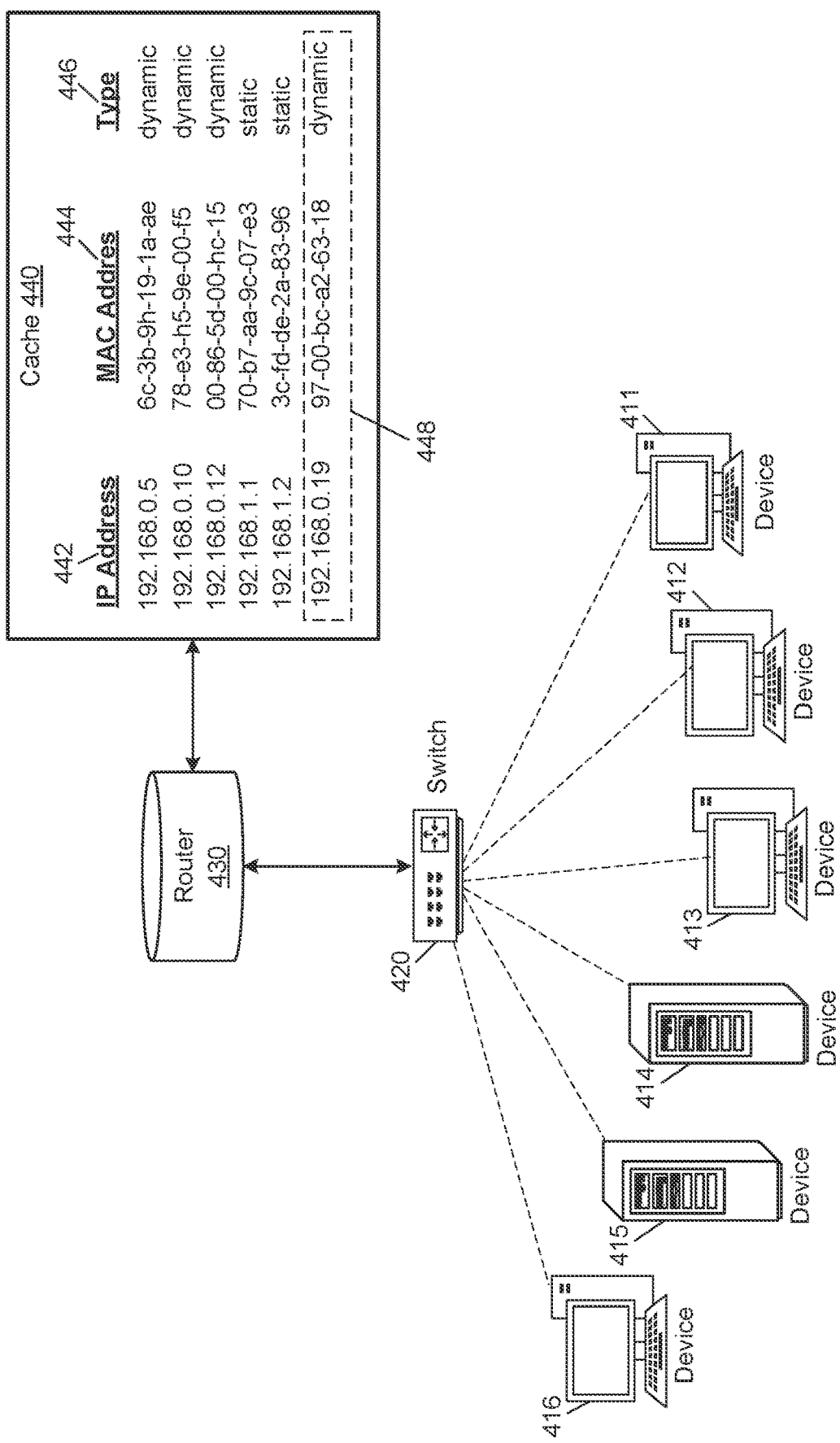

FIG. 4D illustrates a process 400D of the network layer of the TCP IP stack 433 updating the cache 440 with a new entry 448 that includes a mapping between an IP address and a MAC address of the new device 416. The router 430 can perform this process without the need for ARP scanning. However, if scanning is performed, the data link layer (Layer 2) can still be avoided by simply using the IP address and the MAC address for an ARP response from the new device 416.

This process can be used to populate the table within the cache 440 if the MAC address is not currently stored within addressing data in the cache 440. Once done, no further probing is required. In addition, the initial probing is strictly for management purposes and is not required. Devices that wish to reach the Internet may send an ARP request to find the router 430, and therefore will be discovered as needed, without any action on the part of the router 430. If the router 430 finds another device attempting to share its same IP address, it can "override" that rogue device by transmitting an additional ARP response that should refresh the device's ARP cache back to the correct value.

Figure 4E:
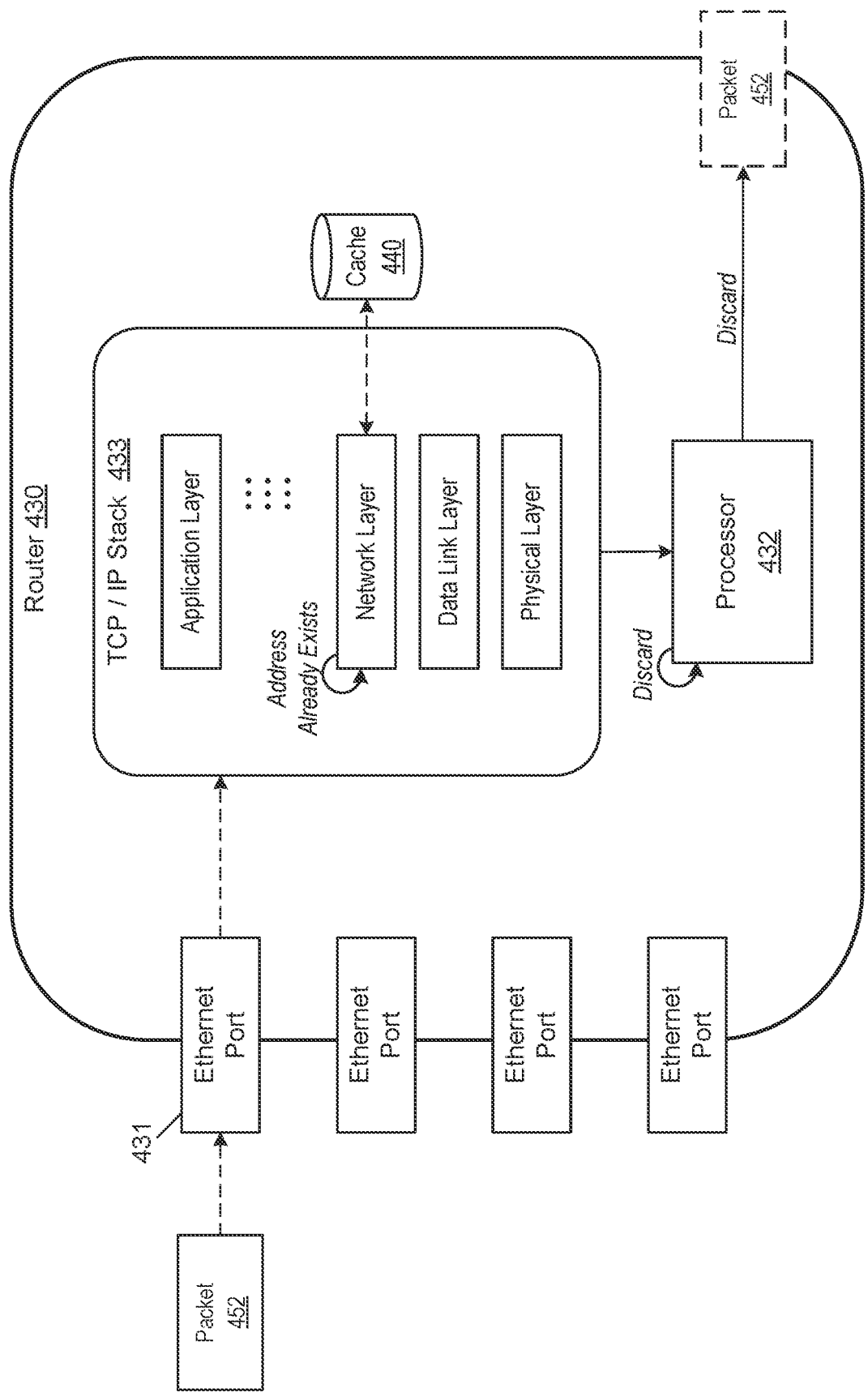

FIG. 4E illustrates a process 400E of the router 430 receiving a second packet 452 from a different device (different IP address) that has the same MAC address as another device already included in the cache 440. Here, the network layer may analyze the cache 440 to detect that the MAC address is already being used by a different IP address, and may trigger the second packet 452 to be discarded. For example, the processor 432 may discard the packet without responding to the rogue device. In doing so, the router 430 may prevent the rogue device from spoofing the MAC address already being used by the other device. That is, the router will not respond to a different device that has the same MAC address as another device that is currently stored in the cache 440. This can prevent an ARP spoofing process performed by a malicious device.

Figure 5:
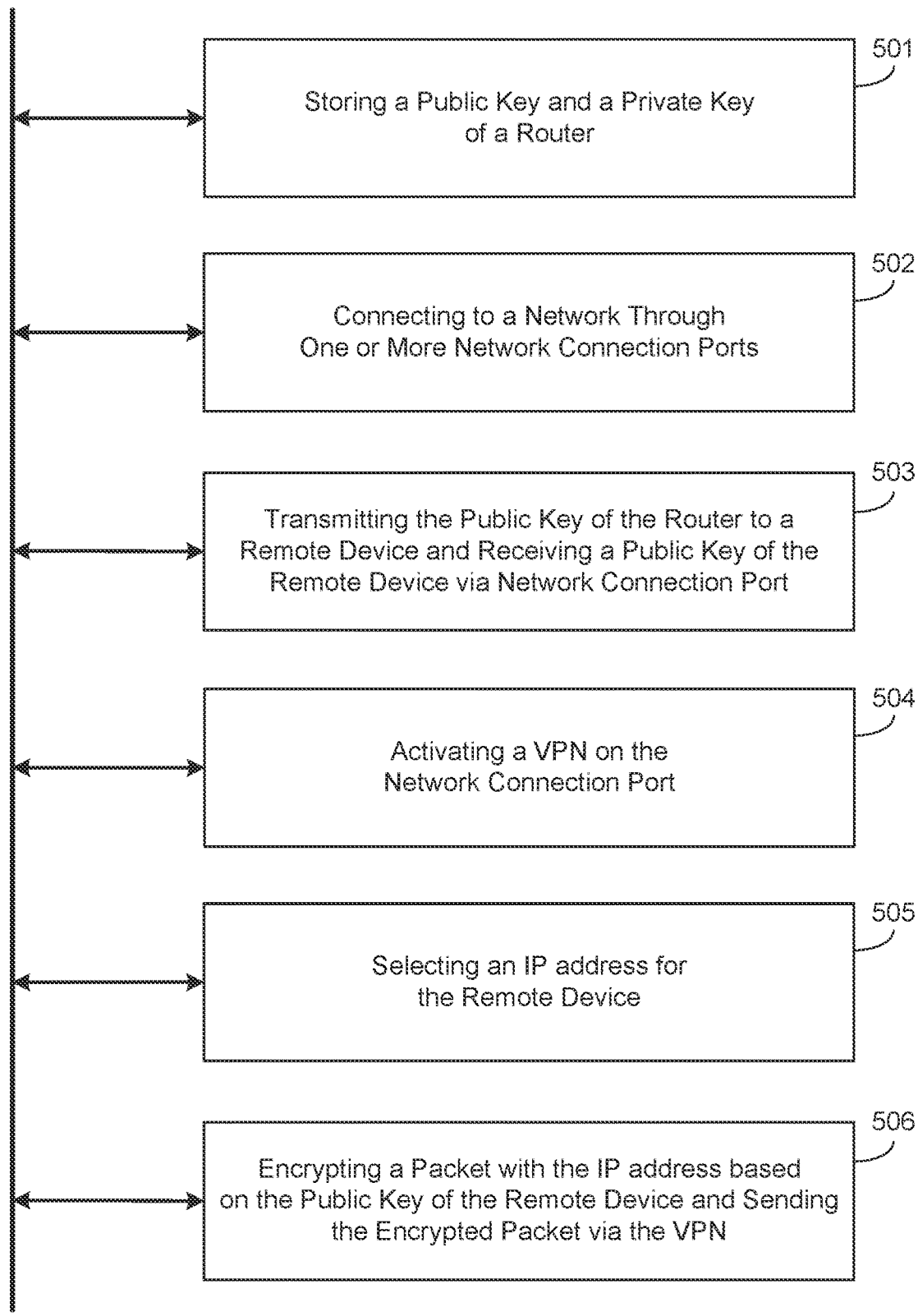
FIG. 5 is a diagram illustrating a method of establishing a virtual private network according to example embodiments.

FIG. 5 illustrates a method 500 of establishing a virtual private network according to example embodiments. For example, the method 500 may be performed by a router shown in any of the examples herein. Referring to FIG. 5, in 501, the method may include storing a public key and a private key of a router. The public key and the private key may be part of a symmetric key pair, or the like. The key pair may be generated by the router. As another example, the key pair may be added by an external device, user, etc.

In 502, the method may include connecting to a network through one or more network connection ports of the router. In 503, the method may include transmitting the public key of the router to a remote device and receiving a public key of the remote device via a network connection port during a public key exchange. In 504, the method may include activating a virtual private network (VPN) on the network connection port based on the public key exchange. In 505, the method may include selecting an Internet Protocol (IP) address for the remote device. In 506, the method may include encrypting a packet with the IP address based on the public key of the remote device and transmitting the encrypted packet to the remote device via the VPN.

In some embodiments, the transmitting the public key may include encrypting the public key of the router with a shared secret prior to transmission of the public key of the router to the remote device. In some embodiments, the receiving the public key of the remote device may include receiving an encrypted public key of the remote device during the public key exchange, and decrypting the encrypted public key based on a shared secret prior to activation of the VPN. In some embodiments, the activating may include enabling dynamic address assignment and a route announcement protocol for the network connection port.

In some embodiments, the selecting the IP address may include dynamically selecting the IP address from among a pool of IP addresses of the router in response to the activation of the VPN. In some embodiments, the method may further include identifying one or more available networks that are connected to the router, encrypting network identifiers of the one or more networks, and transmitting the encrypted network identifiers to the remote device via the VPN. In some embodiments, the method may further include including the encrypted network identifiers with the encrypted IP address within the packet and simultaneously transmitting the encrypted IP address and the encrypted network identifiers to the remote device via the packet.

FIG. 6 illustrates a method 600 of managing router traffic through a network protocol layer of a TCP/IP stack according to example embodiments. For example, the method 600 may be performed by a router shown in any of the examples herein, or any other Internet-connected device such as a switch, hub, etc. Referring to FIG. 6, in 601, the method may include storing address data within a storage of a router that comprises a Transmission Control Protocol/Internet Protocol (TCP/IP) stack. The TCP/IP stack may include software that executes the protocols of the OSI model.

In 602, the method may include establishing a connection between one or more network connection ports of the router and a network. In 603, the method may include receiving a network packet from a device on a network via a network connection port among the one or more network connection ports. In 604, the method may include extracting an Internet Protocol (IP) address of the device and a Media Access Control (MAC) address of the device from the packet. In 605, the method may include determining that the IP address and the MAC address are not stored within the address data in the storage. In 606, the method may include generating, via a network layer, a mapping between the IP address the MAC address and add the mapping into the storage.

In some embodiments, the generating may include generating the mapping and adding the mapping to the storage via the network layer without accessing a data link layer. In some embodiments, the method may further include executing network scanning to identify the device via a transport layer. In this example, the generating may include generating the mapping between the IP address and the MAC address in response to the identification of the device via the network scanning.

In some embodiments, the receiving the packet may include receiving the network packet from the device without a network scanning operation, and the generating comprises generating the mapping between the IP address and the MAC address without perform the network scanning operation. In some embodiments, the method may further include receiving a second network packet from a different device which includes the MAC address, determining that the MAC address is already stored in the storage, and ignoring the second network packet. In some embodiments, the method may further include transmitting a unicast address resolution protocol (ARP) request to the device after the mapping between the IP address and the MAC address has been added to the storage. In some embodiments, the method may further include receiving a response to the ARP request from the device with the MAC address, and determining that the device is still present on the network based on the response to the ARP request.

The above embodiments may be implemented in hardware, in a computer program executed by a processor, in firmware, or in a combination of the above. A computer program may be embodied on a non-transitory computer-readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of non-transitory storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components.

Although an exemplary embodiment of at least one of an apparatus, a method, and a computer-readable medium has been illustrated in the accompanying drawings and described in the foregoing detailed description, it will be understood that the application is not limited to the embodiments disclosed but is capable of numerous rearrangements, modifications, and substitutions as set forth and defined by the following claims. For example, the capabilities of the routing apparatus shown and described with respect to various figures can be performed by one or more processors of the routing apparatus, or other components.

One skilled in the art will appreciate that a "system" could be embodied as a personal computer, a server, a console, a personal digital assistant (PDA), a cell phone, a tablet computing device, a smartphone, a smart-wearable device, or any other suitable computing device, or combination of devices. Presenting the above-described functions as being performed by a "system" is not intended to limit the scope of the present application in any way but is intended to provide one example of many embodiments. Indeed, methods, systems, and apparatuses disclosed herein may be implemented in localized and distributed forms consistent with computing technology.

It should be noted that some of the system features described in this specification have been presented as modules in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction or many instructions and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations, including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order and/or with hardware elements in configurations that are different from those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only, and the scope of the application is to be defined solely by the appended claims when considered with a full range of equivalents and modifications (e.g., protocols, hardware devices, software platforms, etc.) thereto.

What is claimed is:

1. An apparatus, comprising:
   a storage configured to store a public key and a private key at a router;
   one or more network connection ports installed at the router, and
   a processor configured to
      encrypt the public key with a shared secret and transmit the public key of the router through a network connection port of the router to a remote device,
      receive an encrypted public key of the remote device through the network connection port of the router,
      decrypt the encrypted public key at the router based on the shared secret,
      activate a virtual private network (VPN) on the network connection port of the router between the router and the remote device based on the decrypted public key,
      select, by the router, an Internet Protocol (IP) address for the remote device, and
      encrypt a packet at the router with the IP address based on the decrypted public key and transmit the encrypted packet from the router to the remote device via the VPN.

2. The apparatus of claim 1, wherein the processor is further configured to receive the shared secret at the router prior to transmission of the public key of the router to the remote device.

3. The apparatus of claim 1, wherein the processor is further configured to insert route announcement data into the packet at the router prior to encryption, wherein the route announcement data comprises an array of routes being announced.

4. The apparatus of claim 1, wherein the processor is configured to enable a dynamic address assignment and a route announcement protocol for the network connection port with activation of the VPN.

5. The apparatus of claim 1, wherein the processor is configured to dynamically select the IP address from among a pool of IP addresses of the router in response to activation of the VPN.

6. The apparatus of claim 1, wherein the processor is further configured to identify one or more available networks that are connected to the router and include identifiers of the one or more available networks within the packet with the IP address.

7. The apparatus of claim 6, wherein the processor is configured to simultaneously transmit the IP address and the identifiers of the one or more available networks to the remote device via the packet.

8. A method, comprising:
   storing a public key and a private key at a router that includes one or more network connection ports;
   connecting the router to a network through a network connection port of the router;
   encrypting the public key with a shared secret and transmitting the encrypted public key of the router through the network connection port of the router to a remote device;
   receiving an encrypted public key of the remote device through the network connection port;
   decrypting the encrypted public key at the router based on the shared secret;

activating a virtual private network (VPN) on the network connection port between the router and the remote device based on the decrypted public key;

selecting, by the router, an Internet Protocol (IP) address for the remote device; and encrypting a packet at the router with the IP address based on the decrypted public key and transmitting the encrypted packet from the router to the remote device via the VPN.

9. The method of claim 8, further comprising receiving the shared secret at the router prior to transmission of the public key of the router to the remote device.

10. The method of claim 8, further comprising inserting route announcement data into the packet at the router prior to encrypting, wherein the route announcement data comprises an array of routes being announced.

11. The method of claim 8, wherein the activating comprises enabling dynamic address assignment and a route announcement protocol for the network connection port.

12. The method of claim 8, wherein the selecting the IP address comprises dynamically selecting the IP address from among a pool of IP addresses of the router in response to activation of the VPN.

13. The method of claim 8, wherein the method further comprises identifying one or more available networks that are connected to the router and including identifiers of the one or more available networks within the packet.

14. The method of claim 13, wherein the transmitting comprises simultaneously transmitting the IP address and the identifiers of the one or more available networks to the remote device via the packet.

15. A computer-readable storage medium comprising instructions which when executed by a computer cause a processor to perform:

storing a public key and a private key at a router;

connecting the router to a network through a network connection port of the router;

encrypting the public key with a shared secret and transmitting the encrypted public key of the router through the network connection port to a remote device;

receiving an encrypted public key of the remote device through the network connection port;

decrypting the encrypted public key at the router based on the shared secret;

activating a virtual private network (VPN) on the network connection port between the router and the remote device based on the decrypted public key;

selecting, by the router, an Internet Protocol (IP) address for the remote device; and encrypting a packet at the router with the IP address based on the decrypted public key and transmitting the encrypted packet from the router to the remote device via the VPN.

16. The computer-readable storage medium of claim 15, wherein the processor is further configured to perform receiving the shared secret at the router prior to transmission of the public key of the router to the remote device.

17. The computer-readable storage medium of claim 15, wherein the processor is further configured to perform inserting route announcement data into the packet at the router prior to encrypting, wherein the route announcement data comprises an array of routes being announced.

18. The computer-readable storage medium of claim 15, wherein the activating comprises enabling dynamic address assignment and a route announcement protocol for the network connection port.

19. The computer-readable storage medium of claim 15, wherein the selecting the IP address comprises dynamically selecting the IP address from among a pool of IP addresses of the router in response to activation of the VPN.

20. The computer-readable storage medium of claim 15, wherein the processor is further configured to perform identifying one or more available networks that are connected to the router and including identifiers of the one or more available networks within the packet.

* * * * *